(12) United States Patent
Kobatake et al.

(10) Patent No.: US 12,014,757 B2
(45) Date of Patent: Jun. 18, 2024

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Shinichi Kobatake, Yokohama Kanagawa (JP); Toru Watanabe, Kawasaki Kanagawa (JP); Masami Yamane, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/169,407

(22) Filed: Feb. 15, 2023

(65) Prior Publication Data

US 2024/0096357 A1  Mar. 21, 2024

(30) Foreign Application Priority Data

Sep. 16, 2022 (JP) ................. 2022-148072

(51) Int. Cl.
*G11B 5/54* (2006.01)
*G11B 5/012* (2006.01)
(Continued)

(52) U.S. Cl.
CPC ............ *G11B 5/5547* (2013.01); *G11B 5/012* (2013.01); *G11B 19/28* (2013.01)

(58) Field of Classification Search
CPC ............ G11B 19/2054; G11B 19/2063; G11B 19/2072; G11B 5/54; G11B 21/22;
(Continued)

(56) References Cited

U.S. PATENT DOCUMENTS

| 6,243,222 B1 | 6/2001 | Boutaghou et al. |
| 6,693,761 B2 | 2/2004 | Ishii et al. |
| 7,561,367 B2 | 7/2009 | Shreck |

FOREIGN PATENT DOCUMENTS

| JP | H2-168466 A | 6/1990 |
| JP | H5-325396 A | 12/1993 |

(Continued)

*Primary Examiner* — Nabil Z Hindi
(74) *Attorney, Agent, or Firm* — Knobbe, Martens, Olson & Bear, LLP

(57) ABSTRACT

According to one embodiment, a disk device includes a rotatable magnetic disk, an actuator which supports and moves a head, a ramp which holds the head at an unloaded position, a motor which rotates the magnetic disk, and a controller which performs a load operation and a seek operation. When a radial travel speed of the head during the load operation is referred to as Vr1, a circumferential travel speed of the head is referred to as Vt1, a radial travel speed of the head during the seek operation is referred to as Vrs, and a circumferential travel speed is referred to as Vts, the controller controls at least one of the radial travel speed of the head and number of revolutions of the magnetic disk to satisfy a relationship $(Vr1/Vt1)<(Vrs/Vts)$.

6 Claims, 8 Drawing Sheets

(51) Int. Cl.
*G11B 5/55* (2006.01)
*G11B 19/28* (2006.01)

(58) Field of Classification Search
CPC ......... G11B 21/12; G11B 5/58; G11B 5/5552; G11B 5/56
USPC .............................................. 360/75, 73.03
See application file for complete search history.

(56) References Cited

FOREIGN PATENT DOCUMENTS

JP          H8-221880 A      8/1996
JP          2001-344918    * 12/2001   ............... G11B 5/54

* cited by examiner

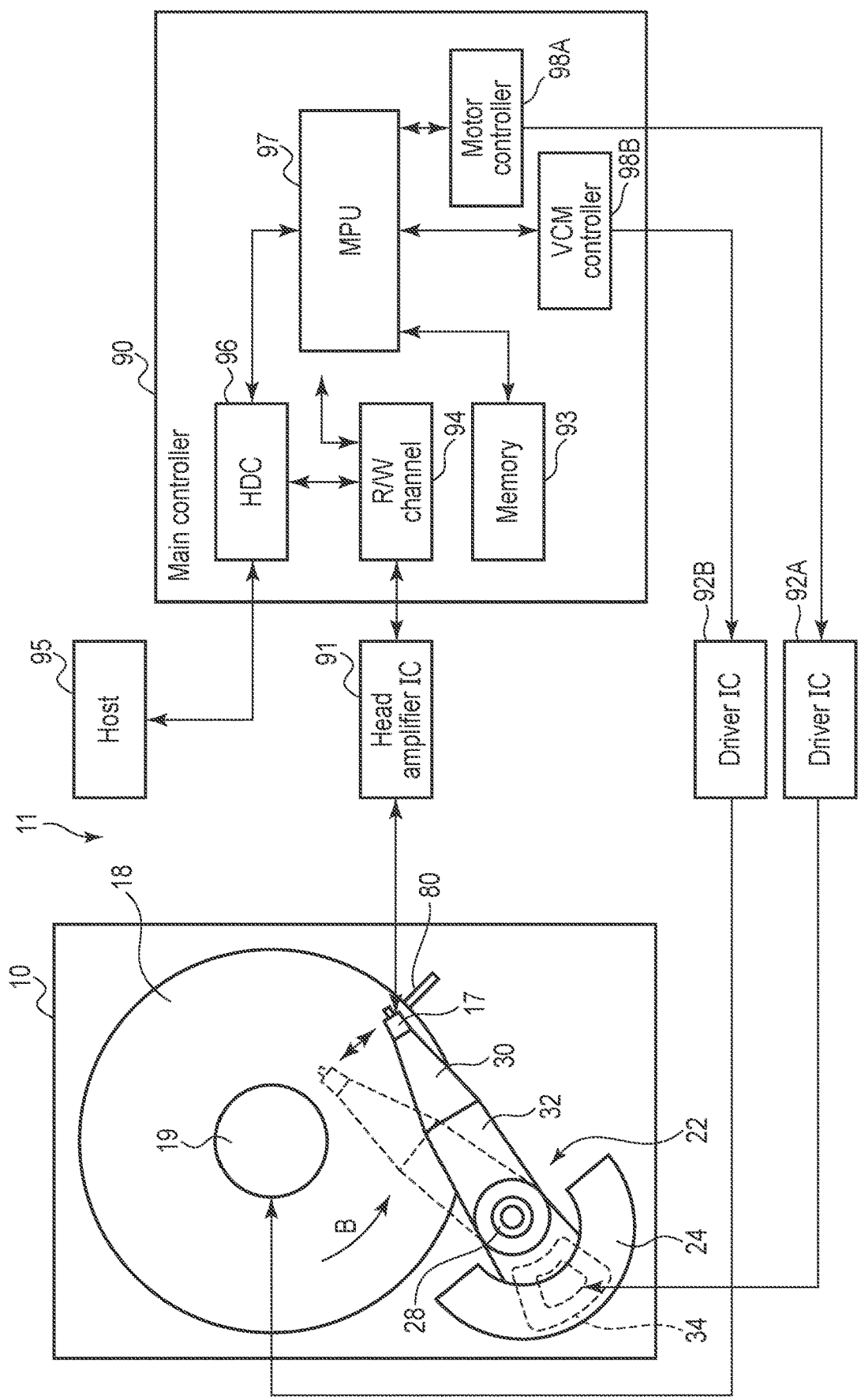
F I G. 5

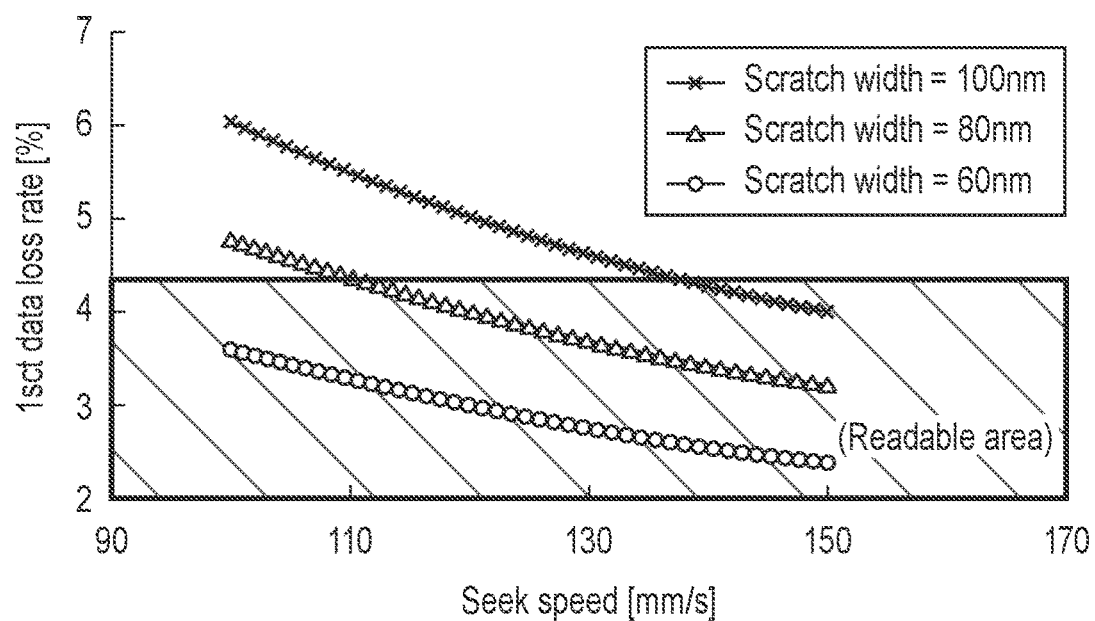
F I G. 10
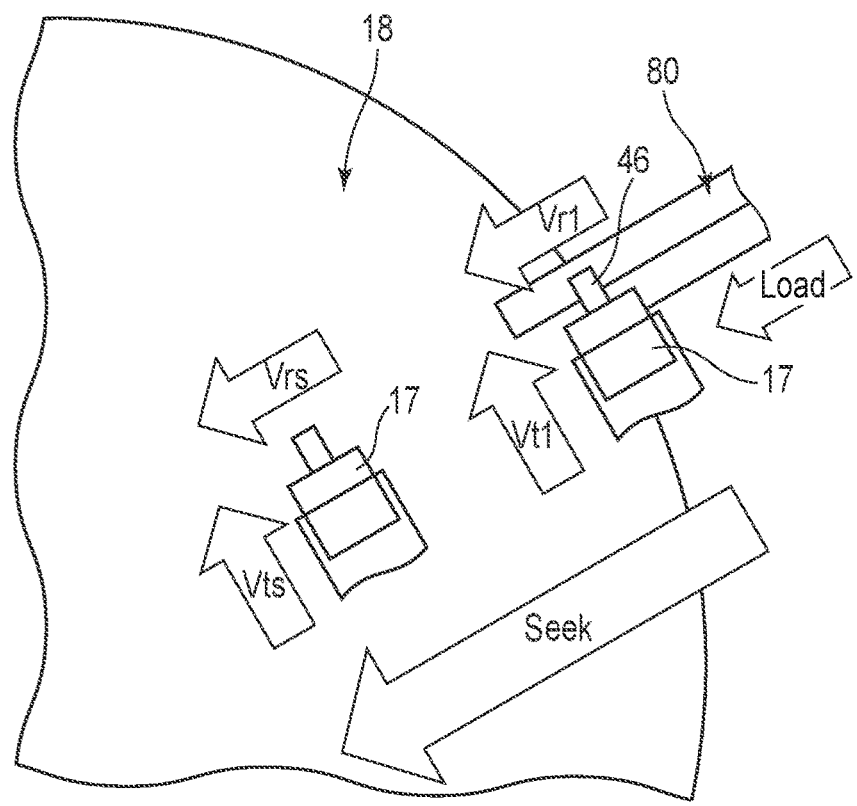
F I G. 11

MAGNETIC DISK DEVICE

CROSS-REFERENCE TO RELATED APPLICATIONS

This application is based upon and claims the benefit of priority from Japanese Patent Application No. 2022-148072, filed Sep. 16, 2022, the entire contents of which are incorporated herein by reference.

FIELD

Embodiments described herein relate generally to a magnetic disk device.

BACKGROUND

As a magnetic disk device, for example, a hard disk drive (HDD) comprises a magnetic disk provided to be freely rotatable and a magnetic head that performs recording data to and reading data from the magnetic disk. The magnetic head comprises a slider (head slider) and a head unit provided on the slider. The magnetic head is opposed to a magnetic disk surface with a certain gap, during an operation of the HDD.

One of major failures in the HDD is a scratch on the magnetic head or magnetic disk, which is made when contamination such as dust and dirt (hereinafter often referred to as "contaminants") attached to a medium is in contact with the magnetic head. The interior of the HDD is maintained at a high cleanliness, but a small quantity of contamination such as dust and dirt exists. For this reason, improvement to prevent failures from occurring even when contamination comes into contact with the magnetic head is required.

BRIEF DESCRIPTION OF THE DRAWINGS

FIG. 5 is an enlarged side view showing a part of the lamp.

FIG. 10 is a graph showing a relationship between a seek speed of a head and a data loss rate.

FIG. 11 is a view showing a radial velocity and a circumferential velocity during a load operation and a seek operation.

DETAILED DESCRIPTION

Figure 1:
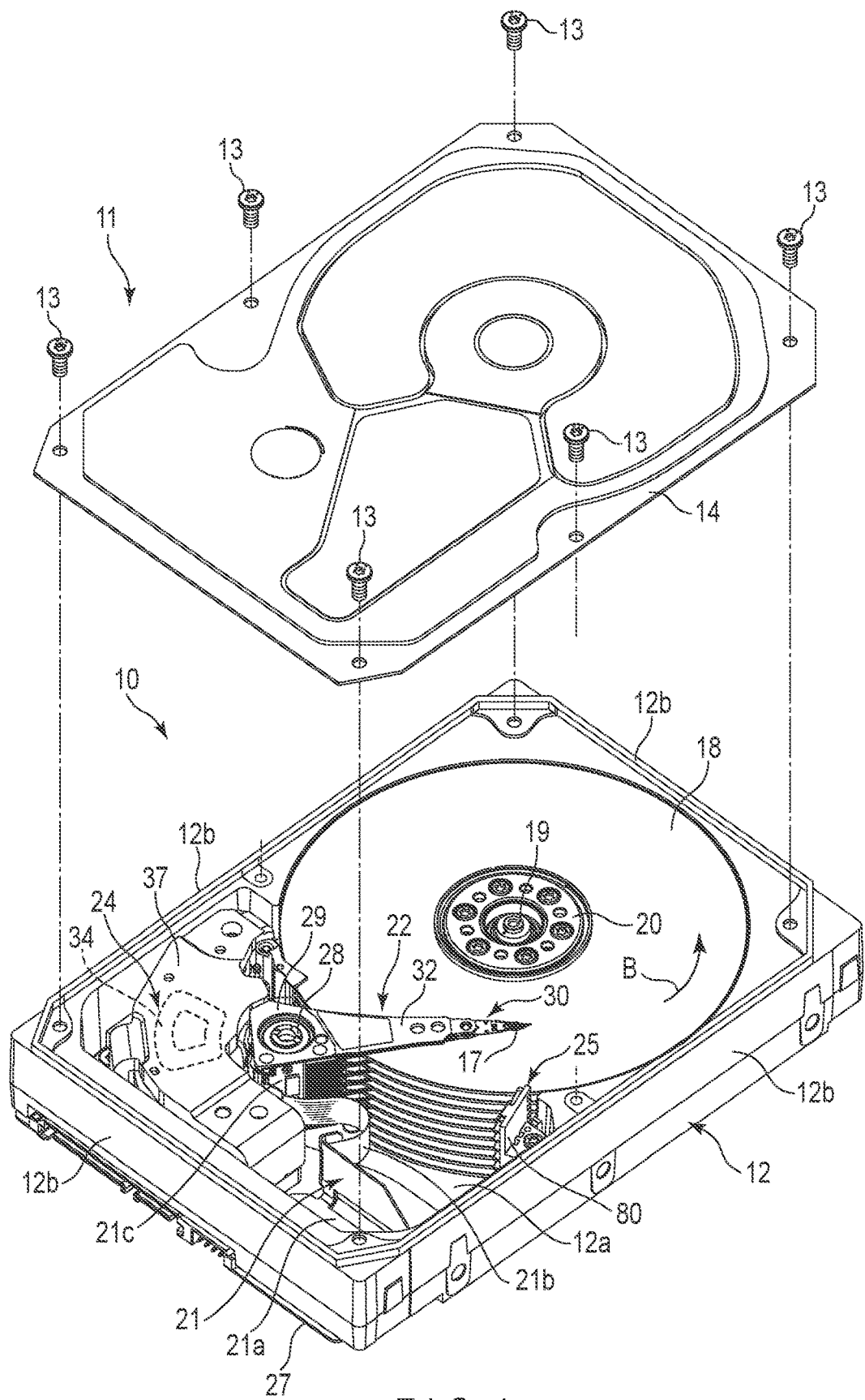
FIG. 1 is an exploded perspective view showing a hard disk drive (HDD) according to an embodiment.

Various embodiments will be described hereinafter with reference to the accompanying drawings. In general, according to one embodiment, a disk device comprises: a rotatable magnetic disk; an actuator which supports and moves a head in a radial direction of the magnetic disk; a ramp which holds the head at an unloaded position on an outer circumferential side of the magnetic disk; a motor which rotates the magnetic disk; and a controller which performs a load operation of loading the head from the ramp onto the magnetic disk and a seek operation of moving the head from an outer circumference to an inner circumference side of the magnetic disk after loading. When a radial travel speed of the head during the load operation is referred to as Vr1, a circumferential travel speed of the head based on rotation of the magnetic disk is referred to as Vt1, a radial travel speed of the head during the seek operation is referred to as Vrs, and a circumferential travel speed is referred to as Vts, the controller controls at least one of the radial travel speed of the head and number of revolutions of the magnetic disk to satisfy a relationship (Vr1/Vt1)<(Vrs/Vts).

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted or simplified unless necessary.

EMBODIMENTS

A hard disk drive (HDD) according to one of embodiments will be described in detail as a magnetic disk device. FIG. 1 is an exploded perspective view showing the HDD of the embodiment with a cover removed.

As shown in FIG. 1, HDD 11 comprises a rectangular housing 10. The housing 10 comprises a base 12 shaped in a rectangular box which is open on its upper side, and a cover (top cover) 14. The base 12 includes a rectangular bottom wall 12a and a side wall 12b erected along a periphery of the bottom wall and is, for example, integrally formed of aluminum. The cover 14 is formed of, for example, stainless steel in a shape of a rectangular plate. The cover 14 is secured onto side walls 12b of the base 12 by a plurality of screws 13 to airtightly close an upper opening of the base 12.

A plurality of, for example, ten magnetic disks 18 that are disk-shaped recording media, and a spindle motor 19 that supports and rotates the magnetic disks 18 are provided inside the housing 10. The spindle motor 19 is arranged on the bottom wall 12a. Each of the magnetic disks 18 comprises, for example, a substrate formed in a disk shape having a diameter of 95 mm (3.5 inches), and magnetic recording layers formed on upper and bottom surfaces of the substrate. Each of the magnetic disks 18 is fitted coaxially on a hub of the spindle motor 20, and is clamped by a clamp spring, so that the magnetic disk 18 is secured to the hub. The magnetic disks 16 are thereby supported in a state of being positioned parallel to the bottom wall 12a of the base 12. The plurality of magnetic disks 18 are rotated in a direction of arrow B at a predetermined number of revolutions by the spindle motor 19. The number of magnetic disks 18 mounted is not limited to ten, but may be nine or less, or ten or more or twelve or less.

A plurality of magnetic heads 17 that record and play back information on the magnetic disks 18 and an actuator assembly 22 that supports these magnetic heads 17 movably against the magnetic disks 18 are provided in the housing 10. In addition, a voice coil motor (VCM) 24 that rotates and positions the actuator assembly 22, a ramp load mechanism 25 that holds the magnetic heads 17 in an unloaded position remote from the magnetic disks 18 when the magnetic heads 17 move to the outermost periphery of the magnetic disks 18, and a board unit (FPC unit) 21 on which electronic components such as a conversion connector are mounted are provided in the housing 10.

The actuator assembly 22 comprises an actuator block 29 supported to be rotatable around a support shaft 28, a plurality of arms 32 extending from the actuator block 29, and suspension assemblies 30 extending from the respective arms 32. The support shaft 28 is erected on the bottom wall 12a. The magnetic heads 17 are supported at the distal portions of the suspension assemblies 30, respectively.

The actuator assembly 22 includes a support frame (not shown) extending from the actuator block 29 in the direction opposite to the arm 32, and a voice coil 34 is supported by this support frame. The voice coil 34 is located between a pair of yokes 37 fixed on the base 12, and constitutes the VCM 24 together with these yokes 37 and a magnet fixed to any of the yokes.

The FPC unit 21 includes a substantially rectangular base portion 21a fixed to the bottom wall 12a, an elongated strip-shaped relay portion 21b extending from one side edge of the base portion 21a, and a junction portion 21c continuously provided at the tip of the relay portion 21b. The base portion 21a, the relay portion 21b, and the junction portion 21c are formed by a flexible printed circuit board (FPC). The junction portion 21c is attached to the actuator block 29.

A printed circuit board 27 is screwed to an outer surface of the bottom wall 12a of the base 12. The base portion 21a of the FPC unit 21 is connected to the printed circuit board 27 via a connector (not shown). The printed circuit board 27 constitutes a control unit (controller) that controls operations of the spindle motor 19 and that controls operations of the VCM 24 and the magnetic heads 17 via the board unit 21.

Figure 2:
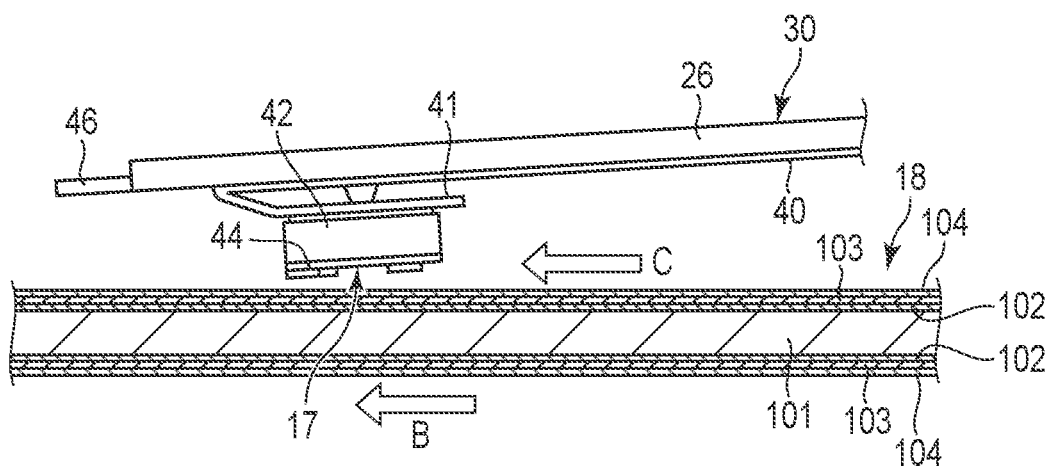
FIG. 2 is a side view showing a magnetic head, a suspension, and a magnetic disk in the HDD.

FIG. 2 is a side view showing the magnetic head in a flying state and the magnetic disk.

As shown in the figure, the magnetic disk 18 comprises a disk-shaped substrate 101 formed of a nonmagnetic material, for example, glass. A base layer 102, a magnetic recording layer 103, and a protective film 104 are sequentially stacked on each of surfaces of the substrate 101. The magnetic disk 18 is rotated in the direction of arrow B at a predetermined speed by the spindle motor 19.

The suspension assembly 30 comprises a suspension 26, a wiring member (flexure) 28 mounted on the suspension 26, and a tab 46 protruding from a tip of the suspension 26. The magnetic head 17 is supported by a gimbal portion 41 of the wiring member 40. The magnetic head 17 is electrically connected to the above-described FPC unit 21 via the wiring member 40.

The magnetic head 17 is configured as a flying type head, and comprises a slider 42 formed in a substantially rectangular parallelepiped shape and a head unit 44 formed at an end portion on a flow-out end (trailing) side of the slider 42. The head unit 44 includes a write head element and a read head element. The magnetic head 17 is maintained in a state of flying at a predetermined amount from the surface of the magnetic disk 18 by airflow C that is generated between the disk surface and the slider 42 by the rotation of the magnetic disk 18. The direction of the airflow C coincides with the direction of rotation B of the magnetic disk 18. In accordance with the rotation of the magnetic disk 18, the magnetic head 17 runs in a direction (peripheral direction) opposite to the direction of rotation B, for the magnetic disk 18.

Figure 3:
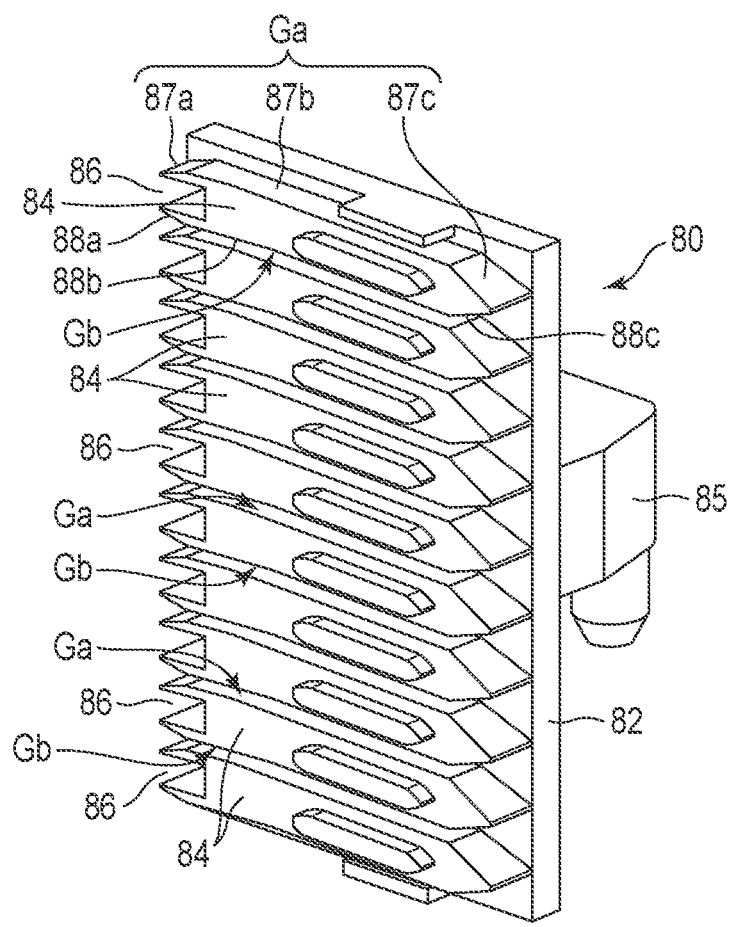
FIG. 3 is a block diagram schematically showing the HDD.
Figure 4:
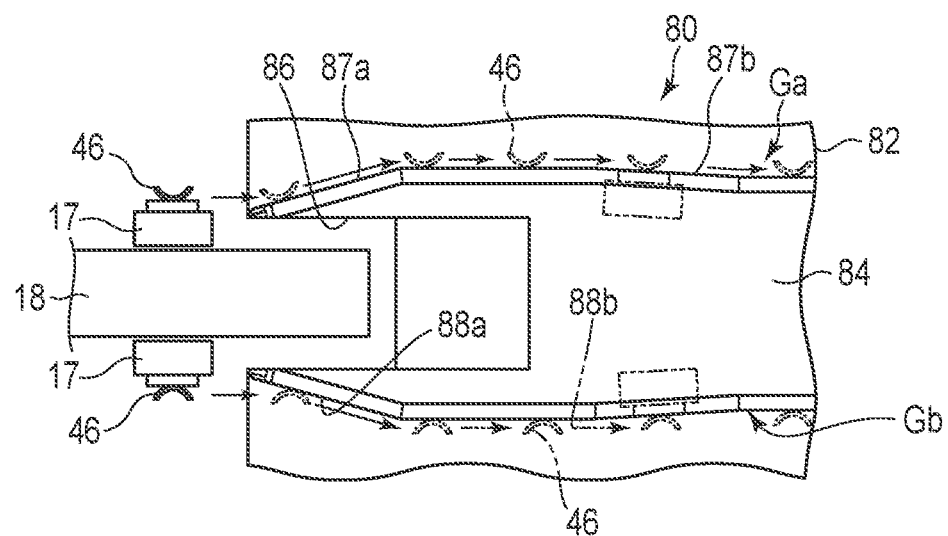
FIG. 4 is a perspective view showing a ramp of the HDD.

Next, a ramp of the ramp load mechanism 25, and a relationship in arrangement between the ramp and the suspension assembly will be described. FIG. 3 is a perspective view showing the ramp of the ramp load mechanism. FIG. 4 is a side view showing the engagement of the ramp with the tip of the suspension assembly.

The ramp load mechanism 25 comprises a ramp 80. As shown in FIG. 1, the ramp 80 is fixed to the bottom wall 12a of the base 12 and is located near the peripheral portions of the magnetic disks 18. When the HDD is not in operation and the magnetic head 17 moves off the outer periphery of the magnetic disk 18 to a predetermined stop position, the tab 46 of the suspension assembly 30 rides on the ramp 80. The magnetic heads 17 are thereby held in the unloaded position remote from the magnetic disk 18.

As shown in FIG. 3, the ramp 80 comprises a ramp body 82 formed in a shape of a rectangular plate, ten guide blocks 84 provided to protrude on one side of the ramp body 82, and a support bracket 85 provided to protrude on the other side of the ramp body 82, which are integrally molded of, for example, synthetic resin or metal. The ramp body 82 is arranged in a state of being erected in a substantially upright position against the bottom wall 12a of the base by fixing the support bracket 85 to the base 12.

The guide blocks 84 have an elongated rectangular parallelepiped shape and extend substantially parallel to the bottom wall 12a. Ten guide blocks 84 are arranged at predetermined intervals in the axial direction of the magnetic disk 18. As shown in FIG. 3 and FIG. 4, a rectangular recess (notch) 86 is formed at one end of the magnetic disk 18 side of each guide block 84. The outer peripheral portions of ten magnetic disks 18 are positioned within the recesses 86 of the corresponding guide blocks with a gap in a state in which the ramp 80 is installed on the base 12.

Each of the guide blocks 84 has an upper guide surface (first guide surface) Ga that guides and supports the tab 46 of the down-head suspension assembly 30 and a lower guide surface (second guide surface) Gb that guides and supports the tab 46 of the up-head suspension assembly 30. The upper guide surface Ga and the lower guide surface Gb are opposed to each other and are provided substantially perpendicularly to one side of the ramp body 82.

The upper guide surfaces Ga and the lower guide surfaces Gb of ten guide blocks 84 are arranged in accordance with the height of the corresponding suspension assemblies 30, respectively. Each of the guide surfaces Ga and Gb extends substantially along the radial direction of the magnetic disk 18 to the vicinity of the outer peripheral edge of the magnetic disk 18 and is located on the travel path of the tab 46.

The upper guide surface Ga includes a first inclined surface 87a that is inclined and extended in a direction of separating from the magnetic disk 18, i.e., an upward direction in this example, from the vicinity of the surface of the magnetic disk 18 (vicinity of the recess 86) to load and unload the magnetic head 17 on the magnetic disk 18, a support surface 87b that is extended substantially parallel to the surface of the magnetic disk continuously from the first inclined surface 87a, and a second inclined surface 87c that is inclined and extended from the other end of the support surface 87b to the end of the guide surface.

Similarly, the lower guide surface Gb includes a first inclined surface 88a that is inclined and extended in a direction of separating from the magnetic disk 18, i.e., a downward direction in this example, from the vicinity of the surface of the magnetic disk 18 (vicinity of the recess 86) to load and unload the magnetic head 17 on the magnetic disk 18, a support surface 88b that is extended substantially parallel to the surface of the magnetic disk continuously from the first inclined surface 88a, and a second inclined surface 88c that is inclined and extended from the other end of the support surface 88b to the end of the guide surface.

According to the HDD 11, the plurality of magnetic heads 17 are moved to a desired seek position, in a state of being opposed to the surface of each of the magnetic disks 18, by rotating the actuator assembly 22 around the support shaft 28 by the VCM 24.

As shown in FIG. 4, when the HDD is not in operation and the magnetic heads 17 move off the outer periphery of the magnetic disk 18 to a predetermined stop position, the tabs 46 of the plurality of suspension assemblies 30 ride on the upper guide surface Ga and the lower guide surface Gb of the corresponding ramp 80, respectively, and move to the predetermined stop position. The magnetic heads 17 are thereby held in the unloaded position remote from the magnetic disk 18.

When the HDD 11 is started, the tabs 46 slide over the upper guide surface Ga and the lower guide surface Gb toward the magnetic disk 18 and move from the inclined surfaces 87a and 88a onto the magnetic disk 18, by rotating the actuator assembly 22 toward the magnetic disk 18 side by the VCM 24. The magnetic heads 17 are thereby loaded onto the magnetic disk 18.

FIG. 5 is a block diagram schematically showing the HDD according to the embodiment.

As shown in the figure, the HDD 11 comprises a head amplifier IC 91, a main controller 90, and driver ICs 92A and 92B, which drive the magnetic heads 17. The head amplifier IC 91 is, for example, provided in an actuator block of the actuator assembly 22 and is electrically connected to the magnetic heads 17. In the embodiment, the head amplifier IC 91 and the main controller 90 constitute a controller of the HDD 11. The main controller 90 and the driver ICs 92A and 92B are constituted on, for example, a printed circuit board 27 provided on the back surface side of the housing 10.

The main controller 90 comprises an R/W channel 94, a hard disk controller (HDC) 96, a microprocessor (MPU) 97, a motor controller 98A, a VCM controller 98B, and a memory 93. The main controller 70 is electrically connected to the magnetic heads 17 through the head amplifier IC 91. The motor controller 98A is electrically connected to the spindle motor 19 via the driver IC 92A. The VCM controller 98B is electrically connected to the voice coil 34 of the VCM 24 via the driver IC 92B. The HDC 96 is connectable to a host computer 95.

The memory 93 stores data such as a travel speed (radial speed) Vr1 and a circumferential speed (equivalent to the number of disk revolutions) Vt1 of the magnetic head in load operations at the activation, a radial speed (seek speed) Vrs and a circumferential speed (equivalent to the number of disk revolutions) Vts of the magnetic head in seek operations, and a seek speed Vr and a circumferential speed (number of disk revolutions) Vt of the magnetic head in normal operations (read and write operations).

The MPU 97 and the motor controller 98A of the main controller 90 control the rotation speed of the spindle motor 19, based on the data stored in the memory 93. The MPU 97 and the VCM controller 98B control radial travel speeds (load speed and seek speed) of the magnetic heads 17, based on the data stored in the memory 93.

Next, the load and seek operations of the magnetic head at the activation, in the HDD 11 configured as described above, will be described.

Figure 6:
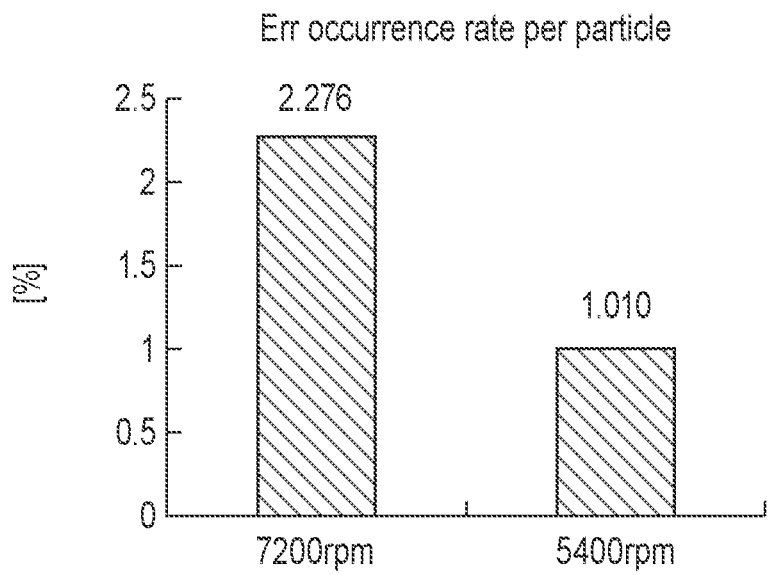
FIG. 6 is a graph showing a relationship between the number of disk revolutions and an error rate in the HDD.
Figure 7:
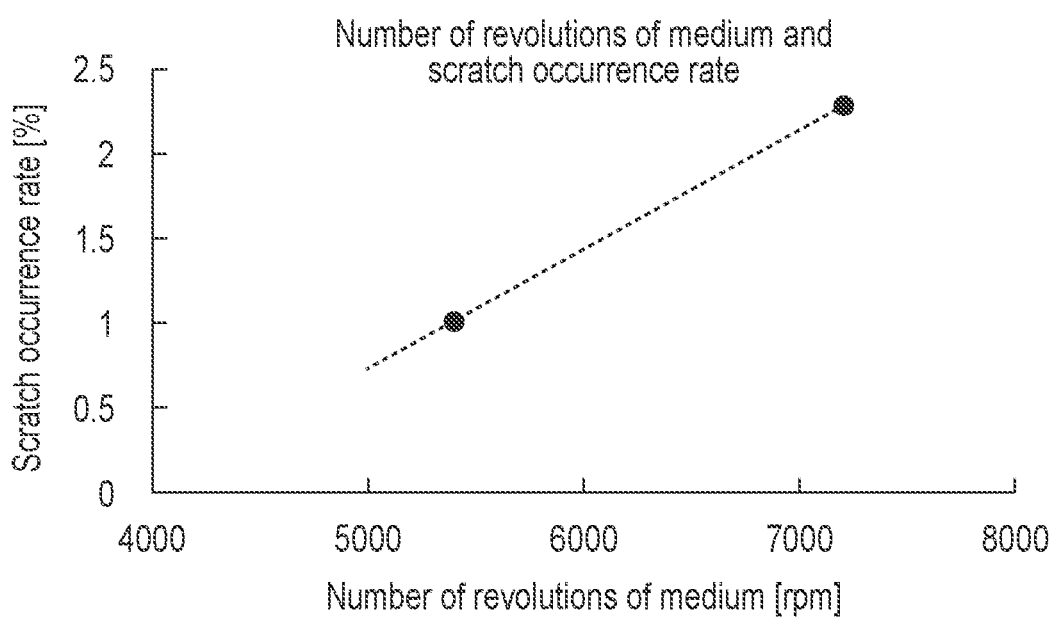
FIG. 7 is a graph showing a relationship between the number of disk revolutions and a scratch occurrence rate in the HDD.
Figure 8:
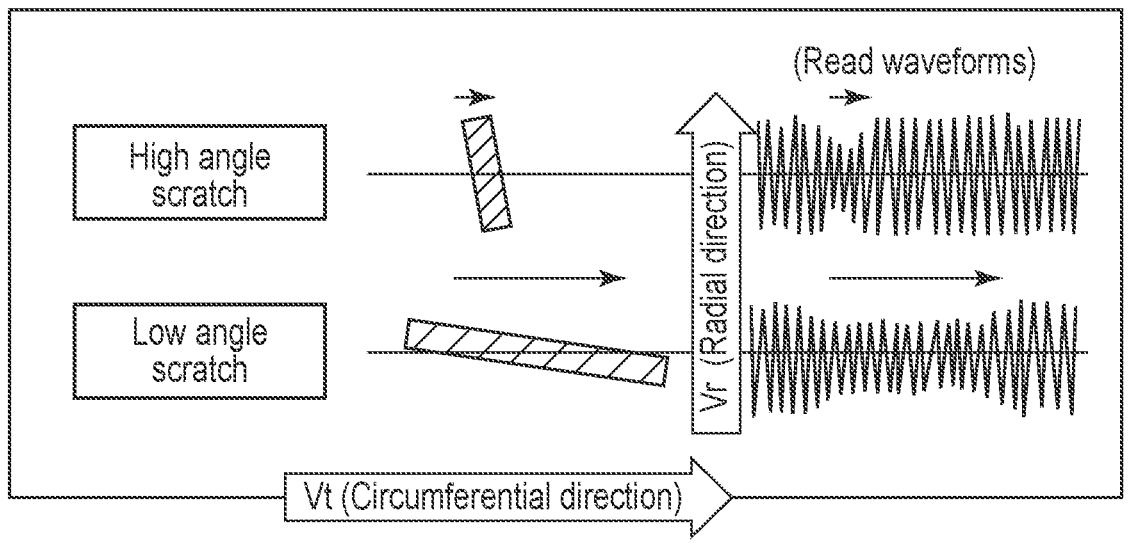
FIG. 8 is a view illustrating a relationship between an angle of a scratch on a recording medium and the occurrence of errors.
Figure 9:
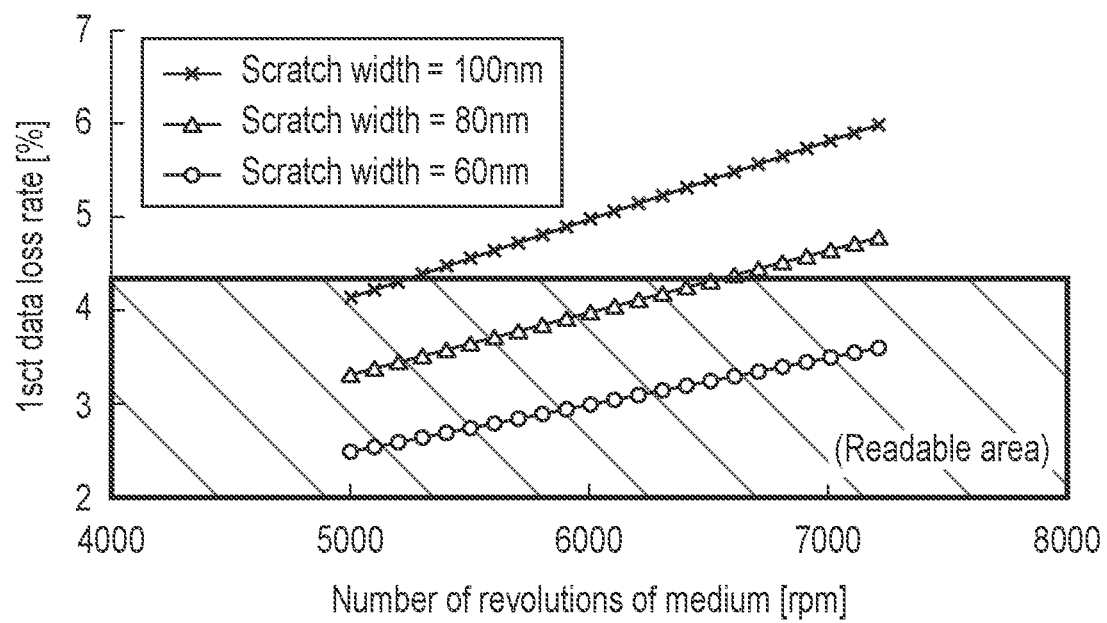
FIG. 9 is a graph showing a relationship between the number of disk rotations and a data loss rate according to a scratch width.

First, factors that cause scratches on magnetic disks due to contamination existing in the housing will be verified. FIG. 6 is a graph showing a relationship between the number of disk revolutions and an error rate in the HDD. FIG. 7 is a graph showing a relationship between the number of disk revolutions and a scratch occurrence rate in the HDD. FIG. 8 is a view schematically showing a relationship between an angle of a scratch on a recording medium and the occurrence of errors. FIG. 9 is a graph showing a relationship between the number of disk rotations and a data loss rate according to a scratch width. FIG. 10 is a graph showing a relationship between the seek speed of the head and a data loss rate.

The number of revolutions (rotational speed) of the magnetic disk greatly influences the possibility of occurrence of scratches on the magnetic disk (error rate) in a case where the magnetic head is brought into contact with contaminants on the recording medium (magnetic disk). As shown in FIG. 6 and FIG. 7, according to experimental results, the error rate (scratch occurrence rate) of the magnetic disk becomes higher as the number of revolutions of the magnetic disk is higher.

This result is considered to be due to the fact that when the number of revolutions of the magnetic disk is small, the medium surface crossing speed of the magnetic head in the seek operation relatively increases, and the circumferential length of damage (scratches) generated on the medium when contaminants are brought into contact with the magnetic head is shorter than that when the number of revolutions is large.

As shown in FIG. 8, when the number of revolutions of the magnetic disk is small (circumferential speed Vt is low) and the seek speed (radial speed Vr) of the magnetic head is relatively high, the scratches formed on the magnetic disk are high angle scratches inclined at a large angle to the circumferential direction and the circumferential length of the scratches is short. In this case, the depression length of the read waveform within a sector is short, and the possibility of occurrence of a read error is low.

In contrast, when the number of revolutions of the magnetic disk is large (circumferential speed Vt is high) and the seek speed (radial speed Vr) of the magnetic head is relatively low, the scratches formed on the magnetic disk are low angle scratches and the circumferential length of the scratches is long. In this case, the depression length of the read waveform within one sector is long and the possibility of occurrence of a read error is high.

For example, it is known that in the case of the read channel of this HDD (4k sector drive) according to the embodiment, a read error does not occur when the data loss due to disk damage is less than 4.3%. In this HDD, one sector length is approximately 500 nm where the media radius position R is 40 mm and the seek speed is 0.1 m/s. If the width of the scratch on the medium is 100 nm, the scratch length in one sector is 23 µm when the number of revolutions is 5,400 rpm. In this case, as shown in FIG. 9, the data loss rate falls within a readable area of less than 4.3%.

In contrast, when the number of revolutions of the magnetic disk is large, for example, 7,200 rpm, the scratch length in one sector is 30 µm. In this case, the data loss rate is higher than 4.3%, which is likely to result in a read error.

It can be understood that as shown in FIG. 9, the reduction of the number of revolutions of the disk is more effective for a scratch with a width narrower than 100 µm, for example, a width of 80 µm or 60 µm. Even if a scratch occurs on a magnetic disk under the condition that the data loss rate is 4.3% or less, data can still be read and no failure is considered to occur.

The data loss rate in one sector also fluctuates when the seek speed of the magnetic head is varied. As shown in FIG. 10, when the medium radius position R is 40 mm and the number of revolutions of the magnetic disk is 7,200 rpm, in the HDD, the data loss rate in one sector decreases by increasing the seek speed whether the scratch width is 100 µm, 80 µm, or 60 µm. It can be understood that when the seek speed is increased from 0.1 m/s to 0.15 m/s, the data loss rate also falls within the readable area for a scratch having a scratch width of 100 µm. In addition, it can be understood that the effect becomes higher as the scratch width is narrower.

According to the HDD of the embodiment, based on the above verification results, reduction in the data loss rate is attempted by controlling the load speed (radial speed) and the circumferential speed (equivalent to the number of revolutions of the disk) during the load operation of the magnetic head, and the travel speed (seek speed) and the circumferential speed (equivalent to the number of revolutions of the disk) of the magnetic head during the seek operation of the magnetic head.

FIG. 11 schematically shows the radial travel speed (component) and the circumferential travel speed (component) of the magnetic head during the load and seek operations.

As shown in the figure, when the radial travel speed of the magnetic head 17 during the load operation is referred to as Vr1, the circumferential travel speed of the magnetic head based on the rotation of the magnetic disk 18 during the load operation (when the magnetic head is loaded onto the magnetic disk from the ramp 80) is referred to as Vt1, the radial travel speed (seek speed) at which the magnetic head 17 travels from the outer periphery to the inner periphery side of the magnetic disk during the seek operation after loading is referred to as Vrs, and the circumferential travel speed of the magnetic head to the magnetic disk is referred to as Vts, the main controller 90 controls the operation of the VCM 24 and/or the spindle motor 19 so as to satisfy a relationship (Vr1/Vt1)<(Vrs/Vts).

For example, when Vr1 is 0.5 m/s and Vt1 is 30 m/s during the load operation in the HDD in which the number of revolutions of the magnetic disk is 7,200 during the normal operations (read and write operations), "(Vr1/Vt1) ≈0.02<(Vrs/Vts)≈0.04" is achieved by setting Vrs to 1 m/s and Vts to 23 m/s during the seek operation. In one example, during the seek operation, the main controller 90 increases the radial travel speed of the magnetic head 17 from 0.5 m/s to 1 m/s and reduces the circumferential travel speed from 30 m/s to 23 m/s, for example, reduces the numbers of revolutions of the magnetic disk 18 and the spindle motor 19 from 7,200 rpm to 5,400 rpm.

Even when scratches occur on the magnetic disk due to the contamination, the circumferential length of the scratches can be shortened and the data loss rate can be kept low by controlling the radial and circumferential travel speeds of the magnetic head as described above. In other words, there is a higher possibility of suppressing the signal directness degradation failure when scratches occur.

According to the embodiment, a whole surface seek of the magnetic disk performed by seeking the magnetic head 17 from the outermost circumference to the innermost circumference of the magnetic disks 18 at least once, in the seek operation described above, at the activation of the HDD.

Figure 12:
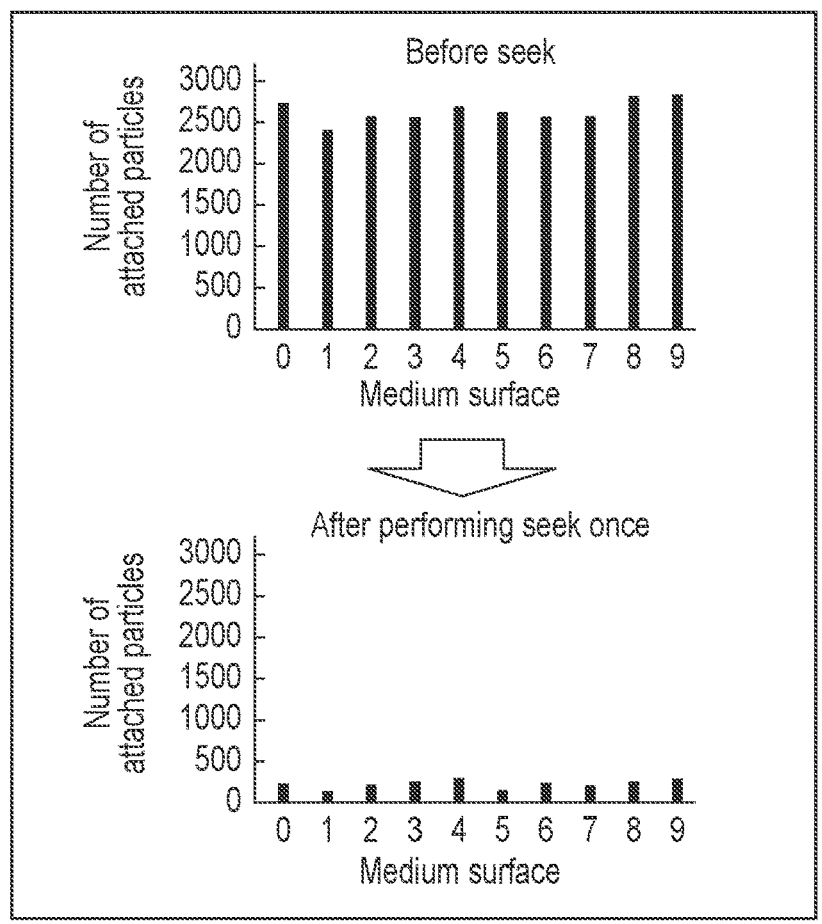
FIG. 12 is a graph showing the number of particles on a medium surface before and after seeking.
Figure 13:
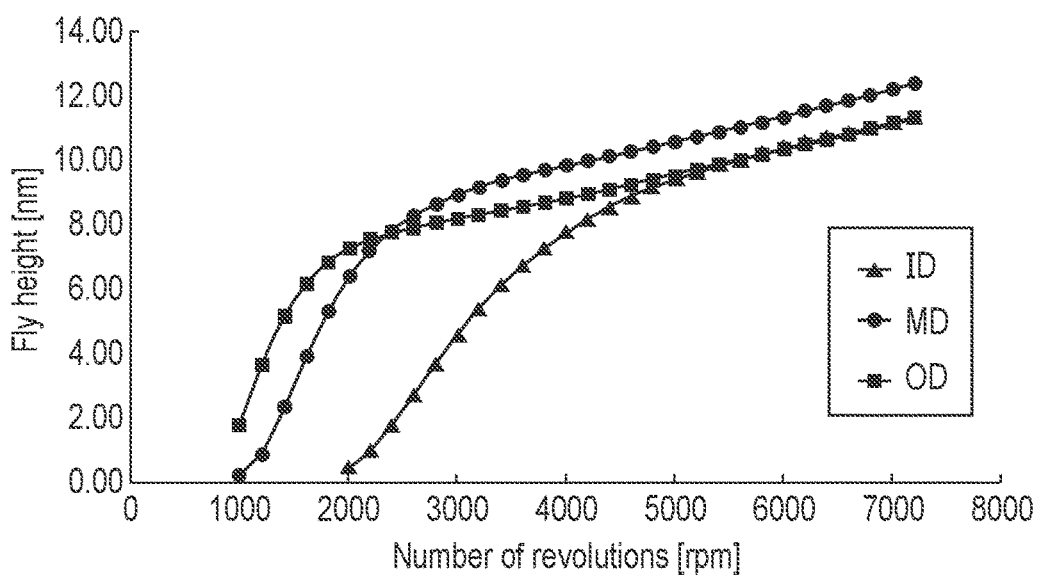
FIG. 13 is a graph showing a relationship between the number of disk rotations and a head raising height for inner, middle, and outer circumferences of a disk.

FIG. 12 is a graph showing the number of particles on the disk surface before and after the seek operation. FIG. 13 is a graph showing a relationship between the number of rotations of the disk and a fly height of the head for inner, middle, and outer circumferences of the disk.

As shown in FIG. 12, more than 90% of the contamination attached to the magnetic disk 18 is removed by a single whole surface seek of the magnetic head 17. During the whole surface seek operation, the seek speed Vrs and the circumferential travel speed Vts of the magnetic head 17 are maintained at Vrs: 1 m/s and Vts: 23 m/s set at the activation described above. In other words, the number of revolutions of the magnetic disk 18 is set to 5,400 rpm.

After the above-described whole surface seek operation, the main controller 90 returns the number of revolutions of the magnetic disk 18 to, for example, 7,200 rpm to perform the processing, in the normal data processing operations (read and write operations).

It can be understood that even when the number of revolutions of the magnetic disk is reduced from 7,200 rpm to 5,400 rpm, the fly posture (fly height) of the magnetic head does not change significantly as shown in FIG. 13. For this reason, even when a whole surface seek operation is performed at the small number of revolutions of approximately 5,400 rpm, the magnetic head 17 is not brought into contact with the magnetic disk surface, and removal of the contamination can be implemented without causing damage to the magnetic head 17 or the magnetic disk 18.

However, the number of revolutions of the magnetic disk cannot be set to any lower level, and the number of revolutions is desirably set by taking into account the fly characteristics and variations of the magnetic head.

According to the HDD of the embodiment configured as described above, the magnetic head is loaded on the magnetic disk surface, the number of revolutions of the magnetic disk is shifted to a low rotation state, and then the whole surface seek of the magnetic disk from the outer circumference to the inner circumference is performed by the magnetic head. Alternatively, the contamination deposited on the magnetic disk can be removed safely and efficiently by increasing the seek speed of the magnetic head and performing the whole surface seek of the magnetic disk from the outer circumference to the inner circumference. In addition, during the activation of the HDD, the crossing speed of the magnetic head is made faster from the viewpoint of the medium by setting the relationship between each speed of the load operation and each speed of the seek operation to (Vr1/Vt1)<(Vrs/Vts). For this reason, even if a scratch occurs on the magnetic disk due to contact between the contaminants and the magnetic head, the scratch is angled with respect to the circumferential direction and a circumferential signal degradation distance can be reduced. Thus, it is possible to remove contaminants on the magnetic disk while reducing the data loss rate and the possibility of read errors.

As a result, according to the embodiment, the disk device capable of reducing the incidence of failures caused by the contamination can be obtained.

In the above-described embodiment, the seek speed Vrs of the magnetic head is increased and the circumferential travel speed (number of revolutions of the disk) Vts is lowered in the seek operation at the activation, but either of the speeds may be controlled. In other words, the relationship of (Vr1/Vt1)<(Vrs/Vts) can be achieved by performing either increasing the seek speed Vrs or decreasing the circumferential travel speed (number of revolutions) Vts.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the magnetic disk device, the number of magnetic disks and magnetic heads can be increased as needed, and the size of the magnetic disks can be selected variously. The travel speeds Vr1, Vt1, Vrs, and Vts of the magnetic heads are not limited to the speeds of the above-described embodiment, but can be adjusted to other speeds as appropriate.

What is claimed is:

1. A disk device comprising:
    a rotatable magnetic disk;
    an actuator which supports and moves a head in a radial direction of the magnetic disk;
    a ramp which holds the head at an unloaded position on an outer circumferential side of the magnetic disk;
    a motor which rotates the magnetic disk; and
    a controller which performs a load operation of loading the head from the ramp onto the magnetic disk and a whole surface seek operation of moving the head from an outermost circumference to an innermost circumference of the magnetic disk after loading, at an activation of the disk device, and which when a radial travel speed of the head during the load operation is referred to as Vr1, a circumferential travel speed of the head based on rotation of the magnetic disk during the load operation is referred to as Vt1, a radial travel speed of the head during the whole surface seek operation is referred to as Vrs, and a circumferential travel speed of the head during the whole surface seek operation is referred to as Vts, controls at least one of the radial travel speed of the head and number of revolutions of the magnetic disk to satisfy a relationship (Vr1/Vt1)<(Vrs/Vts).

2. The disk device of claim 1, wherein
the controller sets the circumferential travel speed Vts of the head during the whole surface seek operation to be slower than the circumferential travel speed Vt1 of the head during the load operation to satisfy the relationship (Vr1/Vt1)<(Vrs/Vts).

3. The disk device of claim 2, wherein
the controller reduces the number of revolutions of the motor to make the circumferential travel speed Vts slower.

4. The disk device of claim 1, wherein
the controller sets the radial travel speed Vrs of the head during the whole surface seek operation to be faster than the radial travel speed Vr1 of the head during the load operation to satisfy the relationship (Vr1/Vt1)<(Vrs/Vts).

5. The disk device of claim 1, wherein
the controller sets the circumferential travel speed Vts of the head during the whole surface seek operation to be slower than the circumferential travel speed Vt1 of the head during the load operation, and sets the radial travel speed Vrs of the head during the whole surface seek operation to be faster than the radial travel speed Vr1 of the head during the load operation to satisfy the relationship (Vr1/Vt1)<(Vrs/Vts).

6. The disk device of claim 1, wherein
the controller moves the head on a whole surface of the magnetic disk from an outer circumference to an inner circumference in a state in which the relationship (Vr1/Vt1)<(Vrs/Vts) is satisfied, during the whole surface seek operation.

* * * * *